United States Patent
Lee et al.

(10) Patent No.: US 11,413,712 B2
(45) Date of Patent: Aug. 16, 2022

(54) LASER WELDING JIG AND LASER WELDING DEVICE COMPRISING SAME

(71) Applicant: LG CHEM, LTD., Seoul (KR)

(72) Inventors: Jung-Hoon Lee, Daejeon (KR);
Dal-Mo Kang, Daejeon (KR);
Sang-Woo Ryu, Daejeon (KR);
Jeong-O Mun, Daejeon (KR);
Jin-Yong Park, Daejeon (KR);
Ho-June Chi, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 617 days.

(21) Appl. No.: 16/469,381

(22) PCT Filed: Aug. 9, 2018

(86) PCT No.: PCT/KR2018/009111
§ 371 (c)(1),
(2) Date: Jun. 13, 2019

(87) PCT Pub. No.: WO2019/050173
PCT Pub. Date: Mar. 14, 2019

(65) Prior Publication Data
US 2019/0386283 A1 Dec. 19, 2019

(30) Foreign Application Priority Data
Sep. 11, 2017 (KR) .......................... 10-2017-0116064

(51) Int. Cl.
*B23K 37/04* (2006.01)
*B23K 26/21* (2014.01)
(Continued)

(52) U.S. Cl.
CPC .............. *B23K 37/04* (2013.01); *B23K 26/21* (2015.10); *B23K 26/60* (2015.10); *H01M 50/531* (2021.01)

(58) Field of Classification Search
CPC ................................ B23K 37/04; B23K 26/21
See application file for complete search history.

(56) References Cited

U.S. PATENT DOCUMENTS 3,270,410 A * 9/1966 Salter ...................... B23P 9/025
29/446
4,702,658 A * 10/1987 Salter ........................ F16B 5/02
403/312
(Continued)

FOREIGN PATENT DOCUMENTS

CN 103650209 A 3/2014
CN 104916804 A 9/2015
(Continued)

OTHER PUBLICATIONS

International Search Report issued in PCT/KR2018/009111 (PCT/ISA/210), dated Nov. 15, 2018.
(Continued)

*Primary Examiner* — Helena Kosanovic
*Assistant Examiner* — Lawrence H Samuels
(74) *Attorney, Agent, or Firm* — Birch, Stewart, Kolasch & Birch, LLP (57) ABSTRACT

A laser welding jig includes a jig body configured to cover the bus bar unit during welding. A plurality of welding slits are formed at the jig body so that electrode leads and at least one lead bus bar are exposed out of the jig body for the welding. A plurality of bolt insert portions are provided between plurality of welding slits. The welding jig also includes at least one bolt insert hole into which at least one pressing bolt is inserted, and a pair of lead adhering blocks provided at a rear surface of each of the bolt insert portions
(Continued)

and configured to be spaced from each other as the pressing bolt is inserted so that the electrode leads are adhered to the lead bus bar.

12 Claims, 10 Drawing Sheets

(51) Int. Cl.
*B23K 26/60* (2014.01)
*H01M 50/531* (2021.01)

(56) References Cited

U.S. PATENT DOCUMENTS

| | | | | |
|---|---|---|---|---|
| 5,517,059 | A | * | 5/1996 | Eytcheson ............... H01L 24/80 219/520 |
| 5,634,754 | A | * | 6/1997 | Weddendorf ........... F16B 35/02 411/383 |
| 11,020,842 | B2 | * | 6/2021 | Jung ....................... B23K 26/70 |
| 2010/0040429 | A1 | * | 2/2010 | Rice ....................... F16B 35/045 411/34 |
| 2010/0047686 | A1 | | 2/2010 | Tsuchiya et al. |
| 2010/0248010 | A1 | | 9/2010 | Butt et al. |
| 2013/0071728 | A1 | | 3/2013 | Shibanuma et al. |
| 2014/0065467 | A1 | | 3/2014 | Choi et al. |
| 2015/0136438 | A1 | | 5/2015 | Lumetta |
| 2015/0263326 | A1 | | 9/2015 | Gunther et al. |
| 2016/0133906 | A1 | | 5/2016 | Kedir et al. |
| 2016/0233476 | A1 | | 8/2016 | Okamoto et al. |
| 2017/0125774 | A1 | | 5/2017 | Choi et al. |
| 2017/0331097 | A1 | | 11/2017 | Lee et al. |
| 2018/0169790 | A1 | * | 6/2018 | Jin ....................... B23K 26/702 |
| 2019/0321945 | A1 | * | 10/2019 | Jung ...................... B23K 26/70 |

FOREIGN PATENT DOCUMENTS

| | | | |
|---|---|---|---|
| CN | 105591048 | A | 5/2016 |
| CN | 106133948 | A | 11/2016 |
| EP | 3 561 906 | A1 | 10/2019 |
| JP | 2600369 | B2 | 4/1997 |
| JP | 2004-327310 | A | 11/2004 |
| JP | 2011-233399 | A | 11/2011 |
| JP | 2012-515418 | A | 7/2012 |
| JP | 5943986 | B2 | 7/2016 |
| KR | 10-2009-0106547 | A | 10/2009 |
| KR | 10-1023184 | B1 | 3/2011 |
| KR | 10-2013-0116562 | A | 10/2013 |
| KR | 10-2015-0125387 | A | 11/2015 |
| KR | 1020150125387 | A * | 11/2015 |
| KR | 10-2016-0043038 | A | 4/2016 |
| KR | 10-2016-0077765 | A | 7/2016 |
| KR | 10-2016-0109035 | A | 9/2016 |
| KR | 10-1750086 | B1 | 6/2017 |

OTHER PUBLICATIONS

Extended Search Report for European Patent Application No. 18854421.7, dated Jul. 8, 2020.

Extended Search Report for European 18854421.7, dated Jun. 8, 2020.

* cited by examiner

LASER WELDING JIG AND LASER WELDING DEVICE COMPRISING SAME

TECHNICAL FIELD

The present disclosure relates to a laser welding jig and a laser welding apparatus including the same.

The present application claims priority to Korean Patent Application No. 10-2017-0116064 filed on Sep. 11, 2017 in the Republic of Korea, the disclosures of which are incorporated herein by reference.

BACKGROUND ART

A secondary battery commercially available at the present as a battery cell includes nickel-cadmium batteries, nickel hydrogen batteries, nickel-zinc batteries, lithium secondary batteries and the like. Among them, the lithium secondary battery is in the limelight since it has almost no memory effect compared to nickel-based battery cells to allow free charging and discharging and also has very low self-discharging rate and high energy density.

The lithium secondary battery generally uses lithium-based oxide and carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior, namely a battery pouch exterior, in which the electrode assembly is accommodated and sealed together with an electrolyte.

Generally, the lithium secondary battery may be classified into a can-type battery cell in which an electrode assembly is included in a metal can and a pouch-type battery cell in which an electrode assembly is included in a pouch made of aluminum laminate sheets, depending on the shape of the exterior.

In recent years, the secondary battery has been widely used not only in small-sized devices such as portable electronic devices but also in medium-sized and large-sized devices such as vehicles and power storage devices. When being used in medium-sized and large-sized devices, a large number of secondary batteries are electrically connected to increase capacity and power. In particular, pouch-type secondary batteries are widely used for the medium-sized and large-sized devices since they are easy to be stacked.

In order to electrically connect secondary batteries inside the battery module, electrode leads may be connected to each other, and the connection portions may be welded to maintain the connection. Further, in the battery module, the secondary batteries may be connected in parallel and/or in series. For this, one end of the electrode lead may be welded to a bus bar for electrical connection between the secondary batteries.

The secondary batteries are often connected by bonding the electrode leads to the bus bar. At this time, in order to electrically connect the secondary batteries in parallel, the electrode leads of the same polarity are connected and bonded to each other. Also, in order to electrically connect the secondary batteries in series, the electrode leads of different polarities are connected and bonded to each other.

In the bonding process, if electrode leads which should not be connected to each other are brought into contact with each other, an internal short circuit may occur to damage the battery pack, and in the worst case, ignition or explosion may occur. Meanwhile, if the electrode leads which should be connected to each other are separated from each other, power may not be suitably supplied from the battery module, thereby causing a power insensitive phenomenon or reducing the capacity or output of the battery module. If the power insensitive phenomenon occurs as above, the operation of a device equipped with a battery module, such as a vehicle, may be stopped, which may lead to a serious accident.

Thus, the contact state of the electrode leads needs to be maintained stable as originally intended, and unintended contact or separation of the electrode leads should not occur. Further, a battery module used in a vehicle or the like is frequently exposed to vibration or impact, and thus there is a continuous demand to develop a battery module capable of stably maintaining the connection state of the electrode leads even under vibration or impact.

In addition, in the battery module, it is necessary to secure the weldability along with the stability of the connection between the electrode leads. For example, if the connection between the electrode leads is stable but the welding is very difficult, the productivity of the battery module may be deteriorated and the likelihood of failure may increase.

In particular, in the battery module, a lead bus bar may be provided for electrically connecting the secondary batteries, and the lead bus bar needs to be in contact with the electrode lead to be welded to the electrode lead. Thus, during the manufacturing process of the battery module, a structure for facilitating the welding work to the bonding portion between the electrode lead and the lead bus bar needs to be provided so that the electrode lead and the lead bus bar may be connected easily. Further, a plurality of electrode leads may be coupled to the lead bus bar by laser welding or the like in order to stably maintain the connection state. In this case, it is desirable that a module structure with excellent weldability is provided.

However, in the conventional battery module, in order to allow the electrode lead of the secondary battery to be stably bonded to the lead bus bar, it is inevitable to bend one end of the electrode lead so that one side surface of the electrode lead with a relatively large area contacts the lead bus bar and then to bond the bent one side surface of the electrode lead to a front surface of the lead bus bar.

In the bonding process, it is necessary to additionally bend the electrode lead to make contact with the lead bus bar, and an additional bending jig is required for this operation. As a result, the welding bonding process between the electrode lead and the lead bus bar becomes complicated and the operation time and cost increase.

In addition, when laser welding is performed for bonding the lead bus bar and the electrode lead, since the space between the electrode leads of the stacked secondary batteries is very narrow, the electrode leads easily come into contact with each other during the welding operation. Thus, it is a very hard work to perform welding without damaging the secondary batteries.

Moreover, the bent portion of the electrode lead as mentioned above causes the need for more work space in the welding process. For example, when a welding process is performed for bonding, there are required a welding spot between the bent portion of the electrode lead and the lead bus bar, a clearance allowance for the welding spot, a disposition space for a welding jig to adhering the electrode lead to the lead bus bar in a bent form, and the like. Thus, the welding work space becomes narrower, which deteriorates the welding efficiency.

In particular, as the thickness of the secondary battery is gradually decreased according to recent trends for a lightweight design, the space for bonding the electrode lead and the lead bus bar is becoming narrower. That is, if the bent direction of the one end of the electrode lead coincides with the stacking direction of secondary batteries, since the secondary batteries have a small thickness in the stacking direction, it is easy to cause interference or damage between neighboring secondary batteries, thereby making the welding work very difficult and increasing the process time.

DISCLOSURE

Technical Problem

The present disclosure is designed to solve the problems of the related art, and therefore the present disclosure is directed to providing a laser welding jig, which may secure improved welding efficiency along with reliable electric connection between an electrode lead and a lead bus bar, and a laser welding apparatus including the laser welding jig.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a laser welding jig for welding electrode leads of at least two battery cells and at least one lead bus bar of a bus bar unit that covers one side surface of the battery cells, the laser welding jig comprising: a jig body configured to cover the bus bar unit during welding; a plurality of welding slits formed at the jig body for exposing electrode leads and the at least one lead bus bar out of the jig body for the welding; a plurality of bolt insert portions provided between the plurality of welding slits and having at least one bolt insert hole; and a pair of lead adhering blocks provided at a rear surface of each of the bolt insert portions and configured to move away from each other as the pressing bolt is inserted so that the electrode leads are adhered to the lead bus bar.

The pair of lead adhering blocks may be mounted to the jig body to be slidable along a longitudinal direction of the jig body.

The pair of lead adhering blocks may gradually move away from each other as the at least one pressing bolt is inserted.

The at least one pressing bolt may include: a bolt head having a diameter corresponding to an inner diameter of the bolt insert hole; a bolt leg having a smaller diameter than the bolt head; and a bolt taper configured to connect the bolt leg and the bolt head and having a diameter gradually decreasing from the bolt head toward the bolt leg.

The pair of lead adhering blocks may respectively have at least one insert guide groove disposed to face each other so that a space is formed therebetween.

The bus bar unit may have at least one bolting groove disposed at the rear of the at least one bolt insert hole when the jig body covers the bus bar.

The welding may be laser welding performed inside the plurality of welding slits.

In another aspect of the present disclosure, there may be provided a laser welding apparatus comprising: a laser welding jig according to the former embodiments; the at least one pressing bolt; and a welding laser configured to irradiate a laser for the welding.

Advantageous Effects

According to various embodiments of the present disclosure, the electrode lead and the lead bus bar may be bonded to secure reliable electric connection without forming a bending structure at the electrode lead of the battery cell.

Thus, in the bonding process for manufacturing the battery module of the present disclosure, the work for bending the electrode lead to contact the lead bus bar may be omitted, and an electrode lead bending work and a bending jig are not necessary, thereby reducing the manufacturing cost and shortening the work time.

In addition, according to this embodiment of the present disclosure, it is possible to solve the problem of the conventional art in which a large work space is required for the welding process due to the bending portion of the electrode lead bonded to the lead bus bar to deteriorate the manufacturing efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
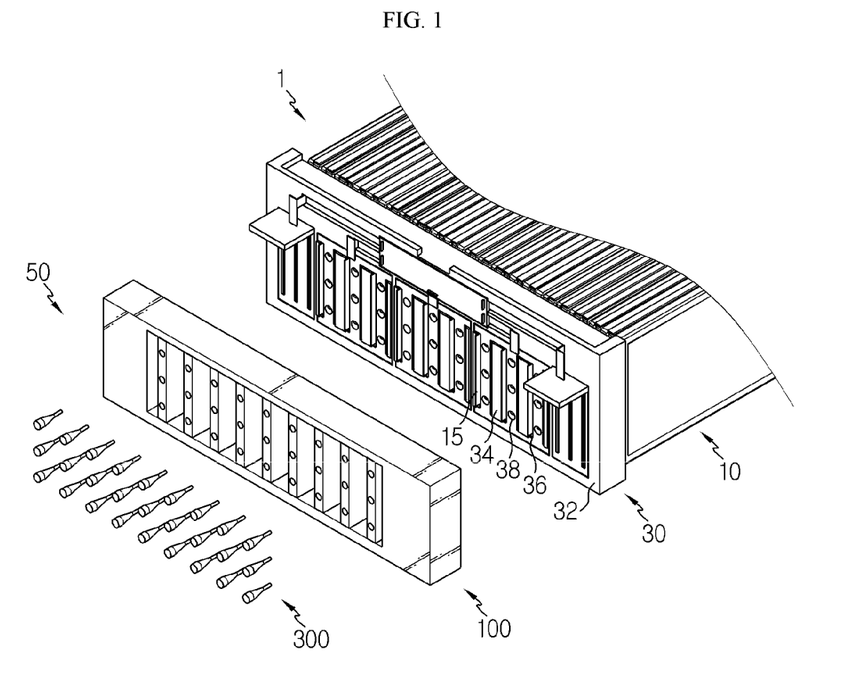
FIG. 1 is a diagram for illustrating a welding process for a battery module according to an embodiment of the present disclosure.
Figure 2:
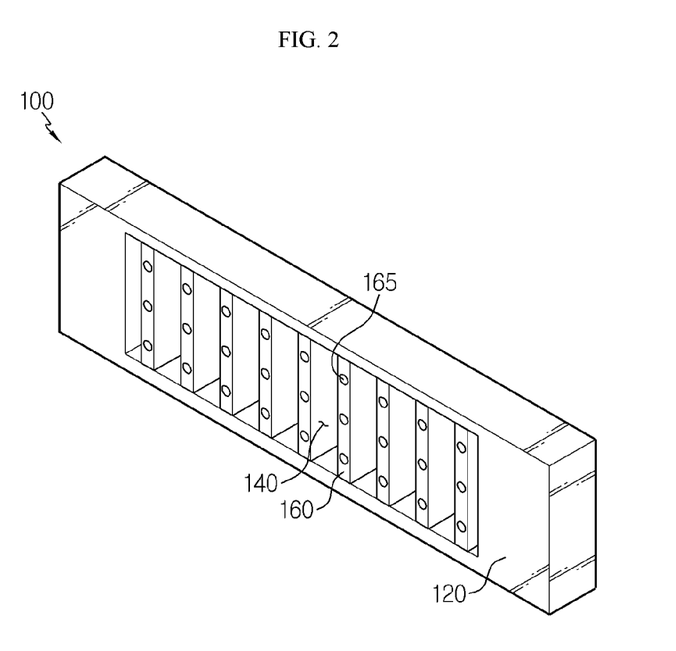
FIG. 2 is a front perspective view showing a laser welding jig of a laser welding apparatus depicted in FIG. 1.
Figure 3:
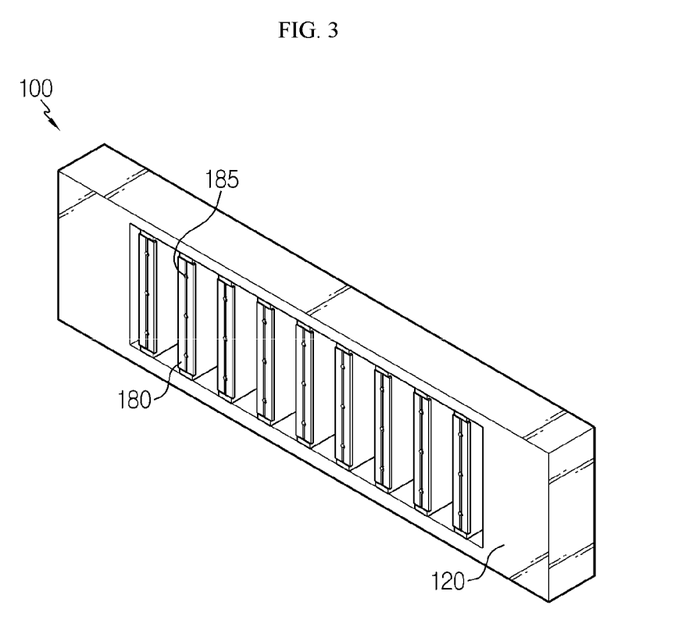
FIG. 3 is a rear perspective view showing the laser welding jig of FIG. 2.
Figure 4:
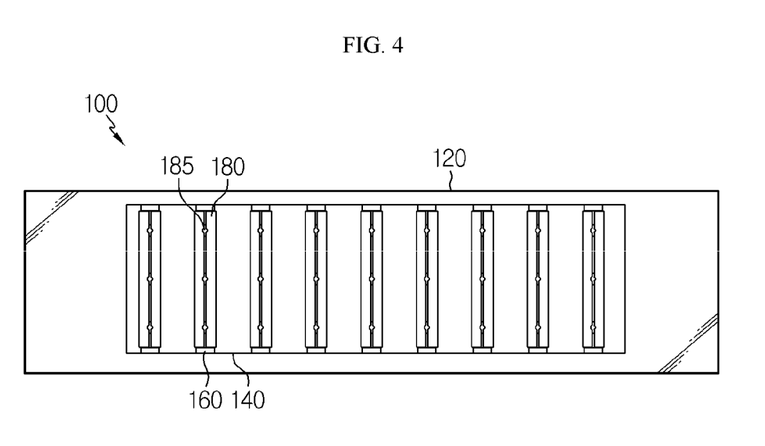
FIG. 4 is a rear view showing the laser welding jig of FIG. 3.
Figure 5:
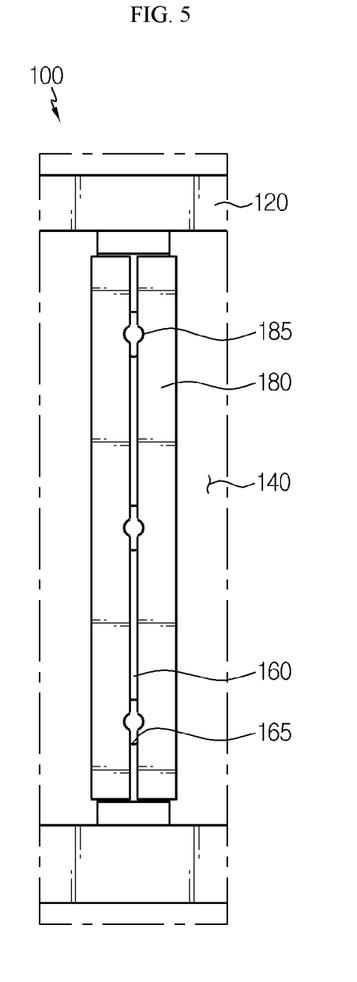
FIGS. 5 and 6 are diagrams for illustrating the sliding of a pair of lead adhering blocks of the laser welding jig depicted in FIG. 4.
Figure 6:
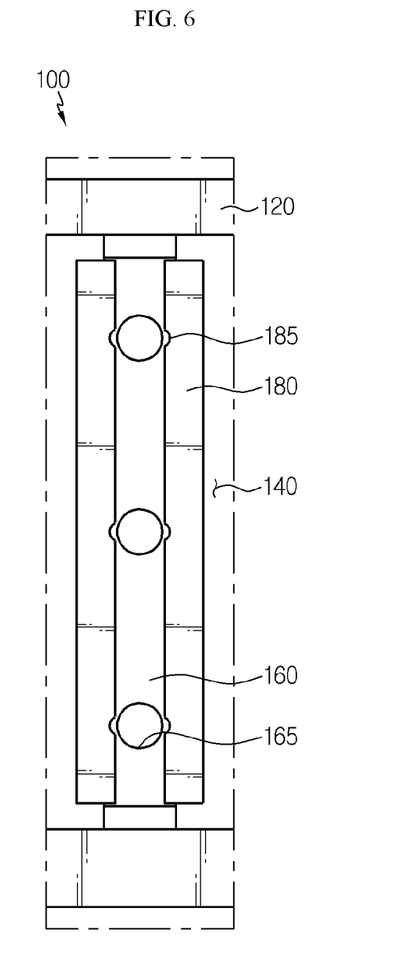
Figure 7:
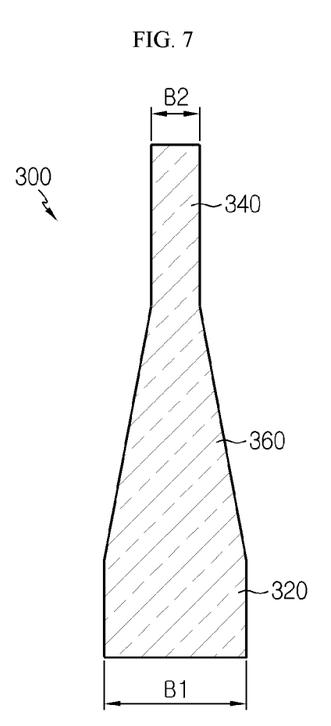
FIG. 7 is a cross-sectioned view showing a pressing bolt of the laser welding apparatus depicted in FIG. 1.

FIG. 1 is a diagram for illustrating a welding process for a battery module according to an embodiment of the present disclosure, FIG. 2 is a front perspective view showing a laser welding jig of a laser welding apparatus depicted in FIG. 1, FIG. 3 is a rear perspective view showing the laser welding jig of FIG. 2, FIG. 4 is a rear view showing the laser welding jig of FIG. 3, FIGS. 5 and 6 are diagrams for illustrating the sliding of a pair of lead adhering blocks of the laser welding jig depicted in FIG. 4, and FIG. 7 is a cross-sectioned view showing a pressing bolt of the laser welding apparatus depicted in FIG. 1.

Referring to FIGS. 1 to 7, a battery module 1 may include at least two battery cells 10, for example a plurality of battery cells 10, and a bus bar unit 30.

The plurality of battery cells 10 may be pouch-type secondary batteries. The plurality of battery cells 10 may be stacked on one another so as to be are electrically connected to each other. In addition, the plurality of battery cells 10 may respectively have electrode leads 15 protruding thereon.

The bus bar unit 30 covers one side surface of the plurality of battery cells 10 and may be electrically connected to the electrode leads 15 of the plurality of battery cells 10 for voltage sensing or the like.

The bus bar unit 30 may include a unit body 32, a lead bus bar 34, a lead slot 36, and a bolting groove 38.

The unit body 32 may be mounted to one side surface of the plurality of battery cells 10 to cover the one side surface of the plurality of battery cells 10.

The lead bus bar 34 is provided at a front surface of the unit body 32 and may be provided in plural. Each of the plurality of lead bus bars 34 may be electrically interconnected with the electrode leads 15 of two battery cells 10. The electrical connection may be performed by means of laser welding using a laser welding apparatus 50, explained later.

The lead slots 36 are formed at the unit body 32 and may be provided in plural. The plurality of lead slots 36 may be provided between the lead bus bars 34. The electrode lead 15 of each battery cell 10 may be protruded to a predetermined length in a forward direction of the unit body 32 after passing through each lead slot 36.

The bolting groove 38 is formed at the unit body 32 and may be provided in plural. The plurality of bolting grooves 38 may be disposed at the rear of the plurality of bolt insert holes 165, explained later, when the jig body 120 of a laser welding jig 100, explained later, covers the bus bar unit 30. A plurality of pressing bolts 300 of the laser welding apparatus 50, explained later, may be inserted into the plurality of bolting grooves 38.

Hereinafter, the laser welding apparatus 50 for welding the electrode leads 15 of the battery cells 10 and the lead bus bars 34 of the bus bar unit 30 will be described in detail.

Figure 11:
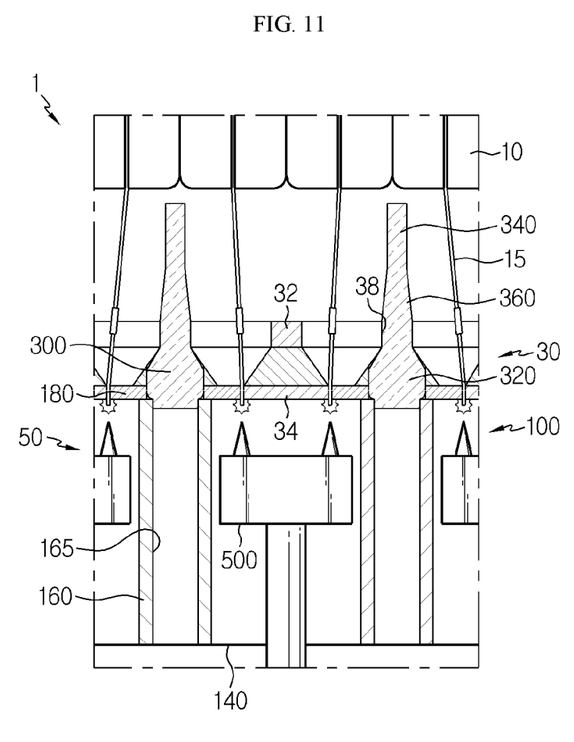

The laser welding apparatus 50 may include a laser welding jig 100, a pressing bolt 300, and a welding laser 500 (see FIG. 11).

The laser welding jig 100 is to weld the electrode leads 15 of at least two battery cells 10 among the battery cells 10 and at least one lead bus bar 34 of the bus bar unit 30 that covers one side surface of the battery cells 10, and the laser welding jig 100 may be mounted to the front of the bus bar unit 30 during the welding.

The laser welding jig 100 may include a jig body 120, a welding slit 140, a bolt insert portion 160, and a lead adhering block 180.

The jig body 120 may cover the bus bar unit 30 during the welding. Specifically, the jig body 120 may cover the front surface of the unit body 32 of the bus bar unit 30 during the welding.

The welding slit 140 is formed at the jig body 120 and may be provided in plural. Each of the welding slits 140 may expose two electrode leads 15 of the battery cells 10 and one lead bus bar 34 among the lead bus bars 34 of the bus bar unit 30 outward at the front portion of the jig body 120.

The bolt insert portion 160 is formed at the jig body 120 and may be provided in plural. The plurality of bolt insert portions 160 are provided between the plurality of welding slits 140 and may respectively have at least one bolt insert hole 165 into which at least one pressing bolt 300, explained later, is inserted.

The bolt insert hole 165 may be provided in plural, and the plurality of bolt insert holes 165 may be disposed to be spaced from each other by a predetermined distance along a vertical direction of each bolt insert portions 160.

The lead adhering block 180 may be provided in plural, and the plurality of lead adhering blocks 180 may be provided in a pair at the rear side of the jig body 120, specifically at a rear surface of each bolt insert portion 160. The pair of lead adhering blocks 180 may be spaced apart from each other as at least one pressing bolt 300, explained later, is inserted, so that the electrode leads 15 respectively in the welding slits 140 are adhered to the lead bus bar 34.

To this end, the pair of lead adhering blocks 180 may be mounted to the jig body 120 to be slidable along the longitudinal direction of the jig body 120. Specifically, the pair of lead adhering blocks 180 may slide to be gradually spaced apart from each other as the at least one pressing bolt 300 is inserted. As the pair of lead adhering blocks 180 respectively provided in the bolt insert portions 165 slide, two electrode leads 15 inside the welding slits 140 may be adhered to the lead bus bar 34.

The pair of lead adhering blocks 180 may respectively have a pair of insert guide grooves 185 for guiding the pressing bolt 300, explained later, to pass therethrough.

The pair of insert guide grooves 185 are disposed to face each other and form a space with a size through which a bolt leg 340 of the pressing bolt 300, explained later, may pass before the pressing bolt 300 passes. Also, the pair of insert guide grooves 185 may be spaced from each other as the pressing bolt 300, explained later, is inserted therein.

The pressing bolt 300 may be provided in plural, and the plurality of pressing bolts 300 may be inserted into the bolt insert hole 165 and the bolting groove 38 to adhere the electrode leads 15 to the lead bus bar 34.

The plurality of pressing bolts 300 may include a bolt head 320, a bolt leg 340, and a bolt taper 360, respectively.

The bolt head 320 may have a diameter B1 corresponding to the inner diameter of the bolt insert hole 165. The bolt leg 340 may have a diameter B2 smaller than the diameter B1 of the bolt head 320. The bolt taper 360 connects the bolt leg 340 and the bolt head 320 and may be formed to have a diameter gradually decreasing from the bolt head 320 toward the bolt leg 340.

A welding laser 500 (see FIG. 11) may weld and connect the electrode leads 15 of the battery cells 10 and the lead bus bar 34 of the bus bar unit 30 inside the plurality of welding slits 140. For the welding, the welding laser 500 may irradiate a laser.

Hereinafter, the welding process for the battery module 1 using the laser welding apparatus 50 will be described in more detail.

FIGS. 8 to 11 are diagrams for illustrating a welding process for the battery module by using the laser welding apparatus of FIG. 1.

Figure 8:
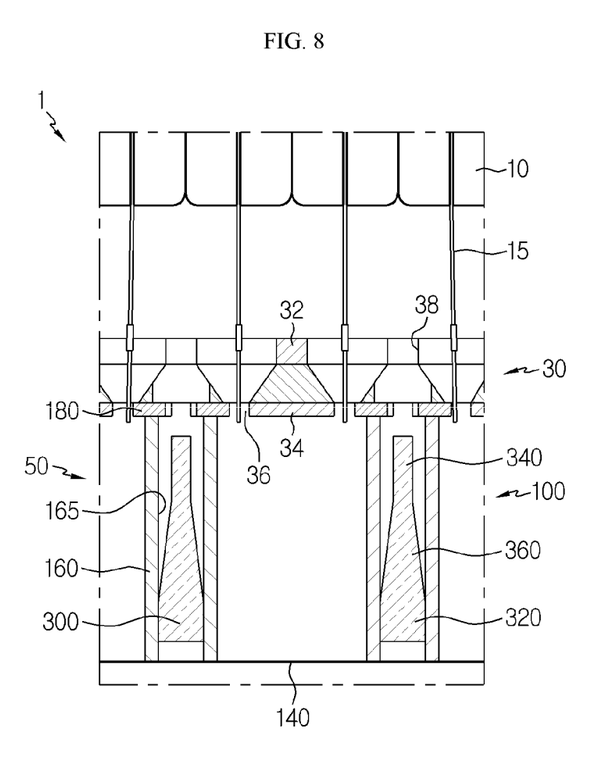
FIGS. 8 to 11 are diagrams for illustrating a welding process for the battery module by using the laser welding apparatus of FIG. 1.

Referring to FIG. 8, when the battery module 1 is welded, a worker or the like mounts the laser welding jig 100 of the laser welding apparatus 50 to a front surface of the bus bar unit 30. At this time, the electrode leads 15 and the lead bus bar 34 may be exposed forward at the welding slits 140 of the laser welding jig 100. After that, the worker or the like inserts the pressing bolts 300 into the bolt insert holes 165 of the bolt insert portions 160.

Figure 9:
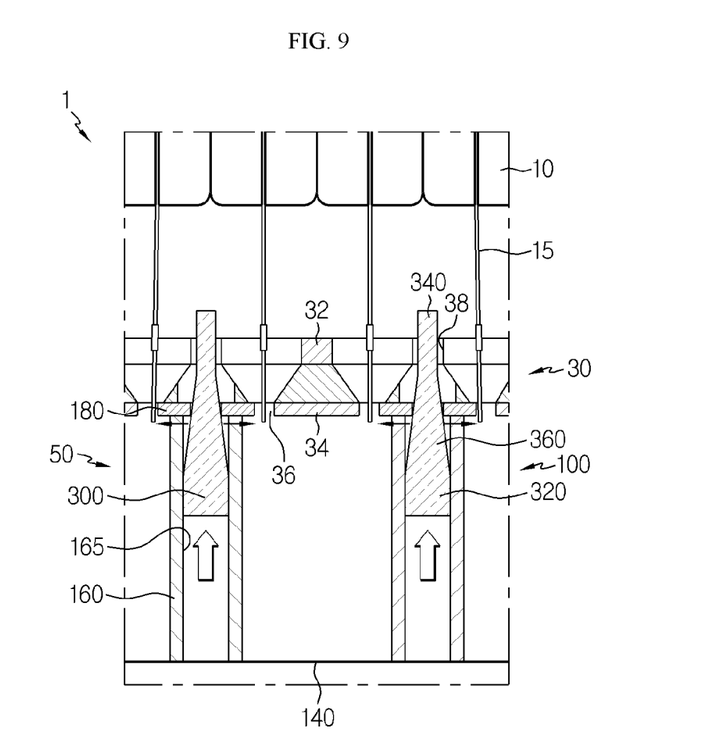

Referring to FIG. 9, as the pressing bolts 300 are inserted into the bus bar unit 30, the lead adhering blocks 180 may approach the electrode leads 15 at both sides of the lead bus bar 34 while sliding near the lead bus bar 34.

Figure 10:
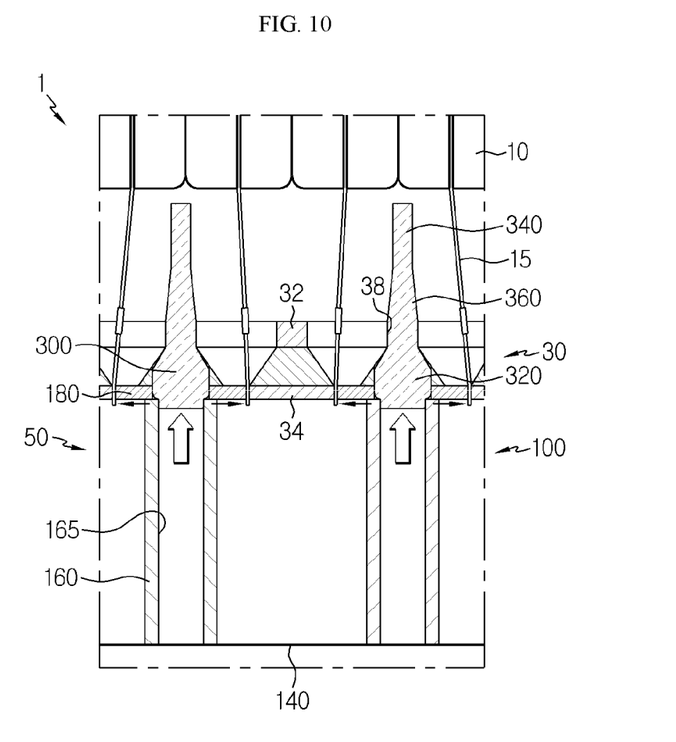

Referring to FIG. 10, the worker or the like may insert the pressing bolts 300 further so that the pressing bolts 300 pass through the bolting grooves 38 of the bus bar unit 30. Accordingly, the lead adhering blocks 180 may adhere the electrode leads 15 at both sides of the lead bus bar 34 to the lead bus bar 34 while moving further toward the lead bus bar 34.

Referring to FIG. 11, in a state where the lead bus bar 34 is adhered to the electrode leads 15 due to the lead adhering blocks 180, the worker or the like may weld and connect the electrode leads 15 and the lead bus bar 34 inside the welding slits 140 by using the welding laser 500.

As described above, in the laser welding apparatus 50 according to this embodiment, since the lead adhering blocks 180 of the laser welding jig 100 slides as the pressing bolt 300 is inserted, the contact state of the electrode leads 15 and the lead bus bar 34 becomes stable, thereby further improving the laser welding efficiency during the welding process.

Moreover, in the laser welding apparatus 50 according to this embodiment, since the bending process of the electrode leads 15 is not required when the electrode leads 15 and the lead bus bar 34 are welded, the welding process may be simplified. Accordingly, in this embodiment, the time and cost for the welding process may be further reduced.

In addition, since the bending process is omitted, it is possible to reduce dead space, which has been inevitably generated in the conventional previous bending process, and it is also possible to produce a slimmer battery module 1 according to the recent slimming trend.

As described above, according to various embodiments of the present disclosure, the electrode lead 15 and the lead bus bar 34 may be bonded to ensure reliable electric connection, without forming a bending structure at the electrode leads 15 of the battery cell 10.

Thus, in the bonding process for manufacturing the battery module 1 of the present disclosure, the work of bending the electrode leads 15 to contact the lead bus bar 34 may be omitted, and it is unnecessary to perform the work for bending the electrode lead 15 and use a bending jig, thereby reducing the manufacturing cost and shortening the working time.

In addition, according to this embodiment of the present disclosure, it is possible to solve the problem of the conventional art in which a large work space is required for the welding process due to the bending portion of the electrode lead 15 bonded to the lead bus bar 34 to deteriorate the manufacturing efficiency.

Meanwhile, even though terms indicating directions such as "up", "down", "right", "left", "front" and "rear" are used in this specification, it will be apparent to those skilled in the art that these terms are only for convenience of explanation and may vary depending on the position of a target to be observed or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A laser welding jig for welding electrode leads of at least two battery cells and at least one lead bus bar of a bus bar that covers one side surface of the battery cells, the laser welding jig comprising:
   a jig body configured to cover the bus bar during welding;
   a plurality of welding slits spaced along a longitudinal direction of the jig body for exposing the electrode leads and the at least one lead bus bar out of the jig body for welding;
   a plurality of bolt insert portions provided between the plurality of welding slits, each of the plurality of bolt insert portions having at least one bolt insert hole; and
   a pair of lead adhering blocks provided at a rear surface of each of the bolt insert portions and configured to move away from each other in the longitudinal direction of the jig body so that the electrode leads are adhered to the lead bus bar.

2. The laser welding jig according to claim 1, wherein the pair of lead adhering blocks gradually move away from each other as the at least one pressing bolt is inserted.

3. The laser welding jig according to claim 1, wherein the pair of lead adhering blocks respectively have at least one insert guide groove disposed to face each other so that a space is formed therebetween.

4. The laser welding jig according to claim 1, wherein the bus bar has at least one bolting groove disposed at the rear of the at least one bolt insert hole when the jig body covers the bus bar.

5. The laser welding jig according to claim 1, wherein the welding is laser welding performed inside the plurality of welding slits.

6. The laser welding jig according to claim 1, wherein the at least one bolt insert hole formed in each of the plurality of bolt insert portions is a plurality of bolt insert holes.

7. The laser welding jig according to claim 1, further comprising a bolt inserted into the at least one bolt insert hole of each of the plurality of bolt insert portions,
   wherein the at least one bolt is tapered along a longitudinal axis.

8. The laser welding jig according to claim 1, further comprising at least one insert guide groove formed between each pair of lead adhering blocks,
   wherein the at least one insert guide groove is aligned with the at least one bolt insert hole formed in a respective one of the plurality of bolt insert portions.

9. A laser welding apparatus, comprising:
   a laser welding jig defined in claim 1;
   at least one pressing bolt inserted into one of the plurality of bolt insert portions; and
   a welding laser configured to irradiate a laser for welding.

10. The laser welding apparatus according to claim 9, wherein the at least one pressing bolt includes:
    a bolt head having a diameter corresponding to an inner diameter of the bolt insert hole;
    a bolt leg having a smaller diameter than the bolt head; and a bolt taper configured to connect the bolt leg and the bolt head and having a diameter gradually decreasing from the bolt head toward the bolt leg.

11. The laser welding jig according to claim 9, wherein the bus bar has at least one bolting groove disposed at the rear of the at least one bolt insert hole when the jig body covers the bus bar, so that the at least one pressing bolt is inserted therein.

12. The laser welding apparatus according to claim 10, wherein the pair of lead adhering blocks respectively have at least one insert guide groove disposed to face each other so that a space is formed therebetween with a size through which the bolt leg is capable of passing, and the at least one insert guide grooves of the pair of lead adhering blocks are spaced from each other as the at least one pressing bolt is inserted.

\* \* \* \* \*